(No Model.)

W. B. BUTCHERS.
DEVICE FOR HOLDING HORSES' TAILS.

No. 249,743. Patented Nov. 22, 1881.

Witnesses:

Inventor:
William B. Butchers,
per
Norman W. Stearns
His Attorney

UNITED STATES PATENT OFFICE.

WILLIAM B. BUTCHERS, OF BOSTON, MASSACHUSETTS.

DEVICE FOR HOLDING HORSES' TAILS.

SPECIFICATION forming part of Letters Patent No. 249,743, dated November 22, 1881.

Application filed September 24, 1881. (No model.)

*To all whom it may concern:*

Be it known that I, WILLIAM B. BUTCHERS, a citizen of the United States, residing at Boston, in the county of Suffolk and State of Massachusetts, have invented a Device for Holding the Tail of a Horse, whereby its movement is prevented while being driven, &c., of which the following is a full, clear, and exact description, reference being had to the accompanying drawings, making a part of this specification, in which—

Figure 1:
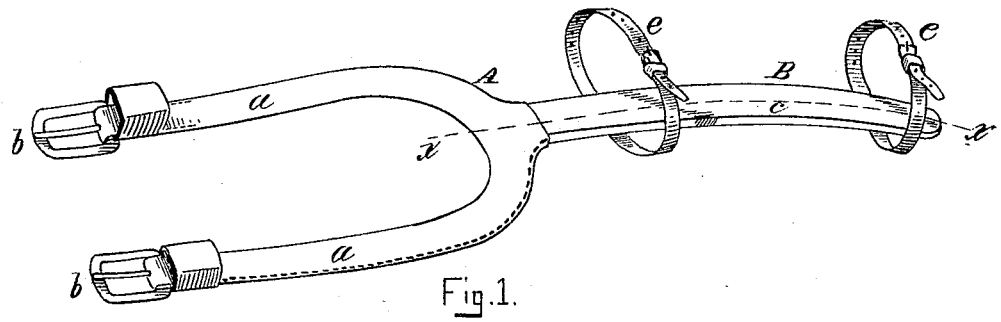
Figure 2:
Figure 3:
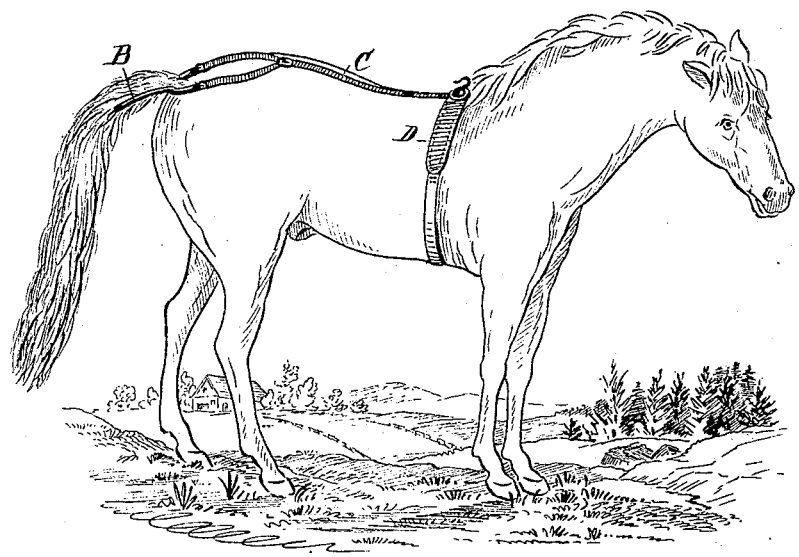

Figure 1 is a perspective view of my said tail-holding device. Fig. 2 is a longitudinal section through the center of the same on line $xx$ of Fig. 1. Fig. 3 represents the application of my invention.

The movement of the tail of a horse or other animal while being driven is objectionable, for the reasons that it not only interferes with the reins and is otherwise annoying to the driver, but in a trial of speed diverts the attention of the horse from his task, the motion of the spine incident to the switching of the tail occasioning a loss of speed.

To remove the above-mentioned objections, especially the impediment to speed, and also to overcome the tendency of the tails of some horses to set or grow to one side, which impairs their appearance, is the object of my present invention, which consists in a rigid crupper having a rigid extension formed integral therewith or rigidly secured thereto, and provided with a means of securing the stump of the tail thereto, whereby the movement or switching of the tail is prevented and its natural pendent position is insured, as desired.

To enable others skilled in the art to understand and use my invention, I will now describe the manner in which I have carried it out.

In the said drawings, A represents my device, the forward or upper portion of which constitutes a crupper of the usual curved form, having bifurcations $a\ a$ to fit around and under the upper portion of the stump and upon the contiguous opposite sides of the rump of the horse.

From the center or lower portion of the curve of the crupper and downward or rearward therefrom, and integral therewith or rigidly secured thereto, projects a rigid narrow strip or extension, B, which serves the office of a tail-holder, the length of which is intended to be slightly less than that of the stump of the tail to rest thereon.

The upper end of each bifurcation of the crupper is provided with a buckle, $b$, for attaching the device to the back-strap C, leading to the saddle D; and the under side of the covering $c$ of the extension B has two slits or loops, $d$, for the passage of two short straps, $e$, of sufficient length to extend up around the stump to be confined thereby.

The entire device—*i. e.*, the crupper and its extension—is formed of a core or interior stiffening-piece, $h$, of metal or other rigid material, (preferably of wrought-iron,) covered with leather $c$ to make a uniform finish with the other leather portions of the harness; but the covering of leather may be dispensed with, if desired, in which case the material constituting the stiffening should be made to imitate in color that of the leather portion of the harness contiguous thereto.

The length of the extension B or tail-holder proper varies with the length of the stump to be secured thereon, being preferably a little shorter than the stump, and the material of which the extension is made will enable it to be readily bent to the shape of the same.

In applying my tail-holding device I first incline the stump upward and locate the upper or crupper portion thereunder, and then, raising the hair from the upper portion of the stump, I bring the extremities of the straps up around its upper side and buckle them in place, after which the hair thus raised is allowed to drop to its normal position, so as to conceal the extension and its fastenings. When thus applied the device arrests the motion of the stump and the tail is kept in a graceful and natural pendent position, whereby the impediment to the speed of the horse incident to the freedom or unrestrained movement of the tail and other above-enumerated objections resulting therefrom are entirely avoided.

By the application of my invention tails of horses which have an inclination to grow or twist to one side out of a straight direction are in time caused to maintain their proper position, the removal of such defect enhancing the general appearance of the animal. The construction and application of my device are such that no necessity arises for any change in the connections of the harness, and consequently it may be readily applied to those already in use.

I have found in practice that a horse provided with my tail-holding device in a trial of speed will make a given distance in five (5) to thirty (30) seconds quicker time than he can without it.

It is evident from the foregoing that the stiffening material of the said device, the length, size, and form of the extension, as well as the means employed for securing the stump thereto, may be varied without departing from the spirit of my invention.

I am aware of the existence of a crupper having a spring device attached thereto for elevating the horse's tail; but The invention which I desire to secure by Letters Patent is—

A device for holding the tail of a horse, consisting of a rigid crupper having a rigid extension formed integral therewith or rigidly secured thereto, and provided with a means of securing the stump of the tail thereon, substantially as described.

Witness my hand this 1st day of September, 1881.

WM. B. BUTCHERS.

In presence of—
N. W. STEARNS,
THOMAS WILSON.